United States Patent [19]

Culnan et al.

[11] Patent Number: 4,905,122
[45] Date of Patent: Feb. 27, 1990

[54] BOLT-IN CIRCUIT BREAKER WITH IMPROVED TERMINAL FASTENER RETAINING STRUCTURE

[75] Inventors: Thomas E. Culnan, Lincoln; Lacy L. Hall, II, Elkhart, both of Ill.

[73] Assignee: Eaton Corporation, Cleveland, Ohio

[21] Appl. No.: 343,758

[22] Filed: Apr. 26, 1989

[51] Int. Cl.⁴ .............................................. H02B 1/04
[52] U.S. Cl. ..................................... 361/376; 439/813
[58] Field of Search ................ 439/801, 813; 361/346, 361/353, 355, 358, 361, 363, 376

[56] References Cited

U.S. PATENT DOCUMENTS

| | | | |
|---|---|---|---|
| 1,138,445 | 5/1915 | Blauvelt | 439/801 |
| 4,040,715 | 8/1977 | Debaigt | 439/813 |
| 4,059,335 | 11/1977 | Simon | 439/813 |
| 4,358,815 | 11/1982 | Koslosky et al. | 361/355 |

*Primary Examiner*—Roy N. Envall, Jr.
*Attorney, Agent, or Firm*—L. G. Vande Zande

[57] ABSTRACT

Lateral ears of a terminal strap are bent sharply upward to form sidewalls spaced apart by the width of the strap, openings in the sidewalls overlapping arcuate edge portions of an annular flange of a threaded nut to loosely captivate the nut in position over a hole in the strap for cooperation with a threaded post projecting through the hole upon attachment of the breaker to a panelboard. Upper edges of the sidewall openings are abutted by the flange, and a frustoconical rear surface of the nut is engaged by the thread post upon installation to automatically align the nut and post.

6 Claims, 1 Drawing Sheet

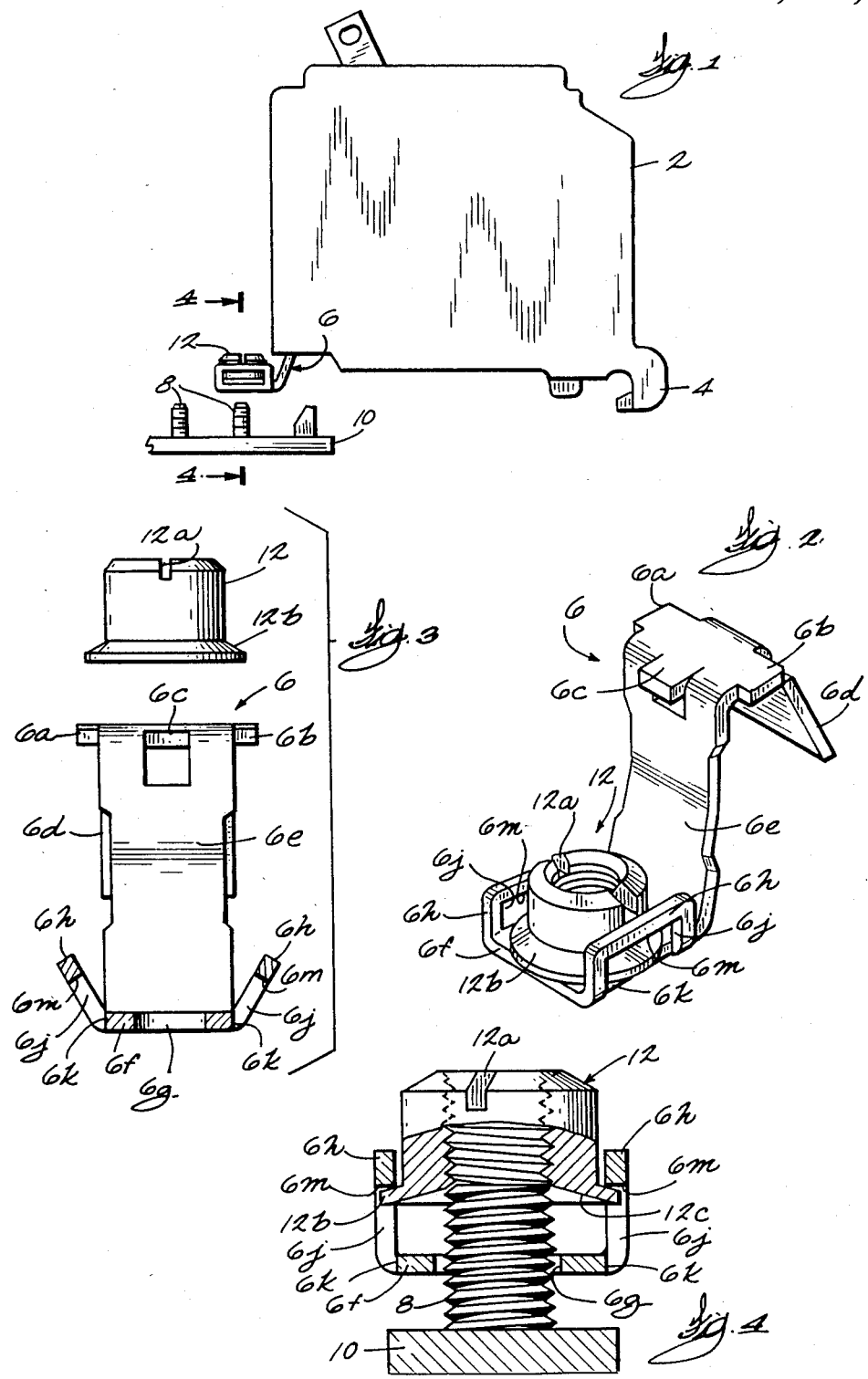

BOLT-IN CIRCUIT BREAKER WITH IMPROVED TERMINAL FASTENER RETAINING STRUCTURE

BACKGROUND OF THE INVENTION

This invention relates to overload responsive circuit breakers which are mounted in a panelboard or load center for protecting apparatus connected in a branch distribution circuit. More particularly, this invention relates to circuit breakers of the aforementioned type wherein the electrical connection of the circuit breaker to the power supply of the panelboard or load center is effected by bolt-in connection of a terminal of the circuit breaker to a supply bus of the panelboard or load center. Specifically, the invention is related to an improved retaining structure for loosely captivating a rotatable element of cooperable threaded fastener means on the terminal of the circuit breaker while the circuit breaker is detached from the panelboard or load center.

It is desirable to captively retain the rotatable threaded fastener element of a bolt-in circuit breaker in operative position on the terminal of the breaker to prevent loss during shipping and handling and for convenience and safety during installation. Electrical connection of circuit breaker terminals to panelboard or load center supply bus are customarily located at the rear of the breaker, substantially remote from the front surface thereof, and access to the fastener element is therefore restricted. By retaining the fastener element in operative position on the circuit breaker terminal, an installer can readily attach the circuit breaker to the panelboard or load center and complete the electrical connection thereof with a screwdriver or similar tool. The installer is not required to reach into a hard to access location to position a loose fastener while attempting to engage that fastener with a tool, potentially dropping the fastener to fall to an undetermined location within the panelboard apparatus whereat it could significantly reduce opposite polarity electrical spacings of that apparatus if not retrieved before power is applied to the panelboard.

An example of bolt-in circuit breakers mounted within a panelboard is shown in U.S. Pat. No. 4,358,815 issued Nov. 9, 1982 to H. E. Koslosky et al and assigned to the assignee of this application. In that patent, a cylindrically shaped threaded nut is retained in position on the terminal of a circuit breaker by a nylon retainer having a loop surrounding the body of the nut and a tongue tucked under an insulating sleeve which is shrink-fit over a leg of the circuit breaker terminal. Although the retainer described therein is well suited for its intended purpose, the assembly method is expensive and is not well suited for automated circuit breaker assembly.

Other retainers have been attempted for use in an automated assembly circuit breaker, but for one reason or another were found to be less than well suited for the intended purpose. For example, in one embodiment a wire loop was placed around the body of the fastener, and the ends of the wire loop were brought closely together, then formed to extend parallel, substantially radially from the loop through an opening in the terminal. The distal ends of the wires were formed over to engage the rear side of the terminal to prevent withdrawal through the opening. However, this structure did not positively locate the fastener in the proper orientation on the terminal for testing purposes during assembly and did not adequately position the fastener in an operative position for installation. Another version provided a cage on the terminal member loosely captivating the threaded fastener therein by forming four outwardly projecting lateral legs in successive right angles to overlie the threaded fastener at four distinct corners, but this version significantly increased the complexity, cost and width of the terminal assembly.

Another example of retention of a bolt-in terminal fastening means element is shown in copending U.S. application Ser. No. 07/192,997 filed May 12, 1988, in the names of Dean A. Hubbard et al entitled "Bolt-In Circuit Breaker With Improved Terminal Fastener Retainer" and assigned to the assignee of this invention, now U.S. Pat No. 4,825,338, issued Apr. 25, 1989. In that application a flexible plastic member having a loop surrounding a cylindrically shaped threaded nuts has a tongue which snaps into a slot in the terminal strap to retain the nut on the terminal strap. The plastic member has integral fingers formed parallel to and outboard of the tongue, the fingers being deflected by the terminal strap to bias the nut against a surface of the terminal strap. This version allows the nut to float angularly during breaker installation, out of axial alignment with the threaded post, requiring the installer to align the cooperating fastener elements during connection of the nut and post.

SUMMARY OF THE INVENTION

This invention provides an improved retaining structure for loosely captivating a threaded fastener element on a terminal of an overload responsive circuit breaker comprising an elongated conductive terminal strap projecting from a circuit breaker having upstanding sidewalls at a distal end thereof, openings in the sidewalls extending longitudinally parallel to a surface of the terminal strap and a hole in the strap between the sidewalls, the threaded fastener element having an annular flange, opposite arcuate portions of which are loosely received in the openings of the sidewalls to rotatably captivate the fastener element on the terminal strap surface over the hole.

This invention, its features and advantages, will become more apparent when reading the following description and claims in conjunction with the accompanying drawings.

BRIEF DESCRIPTION OF THE DRAWINGS

FIG. 1 is a side elevational view of an overload responsive circuit breaker positioned adjacent a branch circuit conductor to which it is to be bolt-in connected;

FIG. 2 is an isometric view of the terminal, fastener element and retaining structure of this invention;

FIG. 3 is an exploded end view of the terminal and fastener element of this invention prior to final assembly thereof; and FIG. 4 is a transverse cross sectional view of the terminal and fastener means of this invention taken along the line 4—4 in FIG. 1.

DESCRIPTION OF THE PREFERRED EMBODIMENT

A molded case, overload responsive circuit breaker 2 is shown in side elevation in FIG. 1. Circuit breaker 2 has a hook 4 formed at its lower right-hand corner (as oriented in the drawing) for attachment in a well known manner to a suitably formed ledge or rail (not shown)

within a panelboard or load center. The lower left-hand corner of circuit breaker 2 is provided with a terminal 6 which is more clearly shown in FIG. 2. Terminal 6 has a particularly structured upper end which includes mounting and positioning tabs 6a, 6b and 6c and an angularly depending wing 6d to which a stationary contact for the circuit breaker may be affixed. The particular shape of the terminal as it exists within the housing of the circuit breaker 2 is not significant to this invention. The pertinent portions of terminal 6 are an angularly depending leg 6e and a horizontally extending distal end 6f thereof. Distal end 6f is provided with an aperture 6g (FIGS. 3 and 4) which is oversize with respect to a threaded post 8 of panelboard conductor 10 to which terminal 6 is to be connected. Aperture 6g is also slightly oblong in the longitudinal direction of distal end 6f of terminal 6 to accommodate some misalignment of the post 8 with the aperture 6g. The distal end 6f of terminal 6 further has integral lateral sidewall members 6h which initially extend outward from the lateral edges of end 6f in the plane of the surface of end 6f. Sidewalls 6h have respective openings 6j, one respective edge 6k of which defines the lateral edge of distal end 6f. Sidewalls 6h are formed upwardly to an angular intermediate position, as shown in FIG. 3, the bending axis for forming the sidewalls being disposed along the respective lateral edges 6k of the end 6f at the upper surface thereof.

A cylindrical, internally threaded nut 12 is provided to be mutually threadably engagable with the post 8 for clamping the terminal end 6f against the surface of branch circuit conductor 10 when nut 12 is threaded tightly upon post 8. Nut 12 has a screwdriver slot 12a in the upper end and an annular flange 12b on the lower end. As best seen in FIG. 4, flange 12b is oriented at a slight rearward angle, defining a shallow frustoconical recess 12c in the rear surface of nut 12 leading to the threaded hole of the nut. The diameter of flange 12b is greater than the width of distal end 6f of terminal 6 as defined by the lateral edges 6k.

Referring to FIG. 3, nut 12 is positioned upon the flat upper surface of distal end 6f of terminal 6 during assembly wherein the threaded hole in nut 12 overlies and aligns with hole 6g in the terminal. The openings 6j in angularly disposed sidewalls 6h provide adequate clearance for flange 12b during assembly. Sidewalls 6h are subsequently bent upward to right angles with terminal end 6f as seen in FIG. 4 wherein the upper edges 6m of openings 6j overlie flange 12b to retain nut 12 loosely captivated to terminal 6. The height of openings 6j allow vertical movement of nut 12 within the retaining structure.

Engagement of the upper end of threaded post 8 with the frustoconical rear surface of nut 12 upon attachment of breaker 2 to the load center or panelboard centers the nut 12 in axial alignment with post 8 and drives the nut upward, causing the upper surface of flange 12b to abut against edges 6m at diametrically opposed arcuate portions of flange 12b. This engagement aligns the nut 12 parallel to the surface of end 6f of terminal 6 because upper edges 6m of openings 6j are aligned parallel with the upper surface of leg 6f, both longitudinally and transversely, wherein the threaded hole is aligned coaxially with post 8. Accordingly, when the breaker is so positioned for attachment to the load center or panelboard, nut 12 self-aligns with post 8 ready for rotation to effect the threaded engagement without requiring further alignment by the installer.

In addition to the above described alignment advantage, the terminal fastener retaining structure of this invention is incorporated directly in the terminal member, requiring no separate retaining part. The sidewalls are readily formed upward and achieve parallelism with the upper surface of the terminal. By utilizing the longitudinally extending upper edges of openings in the sidewalls to overlie the flange on the rotatable fastener element and locating the bending axis for the sidewalls at the upper lateral edges of the terminal end 6f, the overall width of the terminal is increased only by twice the material thickness. As seen in FIG. 4, the width is essentially equal to the diameter of flange 12b. It should be recognized that the rotatably captivated threaded fastener element could alternatively be a screw disposed on the upper surface of end 6f of terminal 6 with the threaded shank projecting downward through hole 6g to threadably engage an opening in conductor 10. In such variation, the head of the screw would be provided with an annular flange similar to flange 12b. The improved bolt-in terminal fastener retaining structure of this invention is susceptible of various other modifications without departing from the scope of the appended claims.

We claim:

1. In an overload responsive circuit breaker having a terminal adapted for bolted connection against a surface of an electric conductor, said terminal comprising:
    an elongated conductive strap projecting from said circuit breaker;
    a hole in said strap;
    upstanding sidewalls at opposite lateral edges of said strap, said sidewalls having longitudinally extending openings; and
    threaded fastener means comprising a rotatable element on said strap and a cooperable fixed element on said conductor, said rotatable element having an annular flange greater in diameter than spacing between said sidewalls, arcuate portions of said flange being received in said sidewall openings, thereby rotatably retaining said rotatable element on said strap, one of said elements comprising a threaded shank extending through said hole.

2. The terminal defined in claim 1 wherein said openings in said sidewalls comprise elongated slots.

3. The terminal defined in claim 2 wherein upper edges of said slots are disposed substantially perpendicular to an axis of said threaded fastener means upon positioning of said circuit breaker to effect initial engagement of said fastening means, said initial engagement urging said annular flange against said upper edges, aligning said rotatable element for threaded engagement with said fixed element.

4. The terminal defined in claim 3 wherein said upstanding sidewalls are initially spread apart at their upper ends to permit assembly of said rotatable element flange into said openings, said sidewalls subsequently being formed at substantially right angles to said strap to entrap said flange within said slots.

5. The terminal defined in claim 4 wherein said rotatable element comprises means engaged by a tool for driving said element.

6. The terminal defined in claim 5 wherein said rotatable element comprises a nut having an internally threaded aperture and said fixed element comprises a thread shank disposed at substantially right angles to said surface.

* * * * *